United States Patent
Porosanu (10) Patent No.: US 10,037,212 B2
(45) Date of Patent: Jul. 31, 2018

(54) INFORMATION PROCESSING DEVICE AND METHOD FOR PROTECTING DATA IN A CALL STACK

(75) Inventor: Alexandru Porosanu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 577 days.

(21) Appl. No.: 14/395,520

(22) PCT Filed: Apr. 20, 2012

(86) PCT No.: PCT/IB2012/051998
§ 371 (c)(1),
(2), (4) Date: Oct. 20, 2014

(87) PCT Pub. No.: WO2013/156823
PCT Pub. Date: Oct. 24, 2013

(65) Prior Publication Data
US 2015/0135181 A1    May 14, 2015

(51) Int. Cl.
*G06F 9/44*    (2018.01)
*G06F 9/448*   (2018.01)
*G06F 11/10*   (2006.01)
*G06F 9/06*    (2006.01)

(52) U.S. Cl.
CPC .............. *G06F 9/44* (2013.01); *G06F 9/06* (2013.01); *G06F 9/4423* (2013.01); *G06F 9/4482* (2018.02); *G06F 11/1004* (2013.01)

(58) Field of Classification Search
CPC .. G06F 11/3476; G06F 11/0781; G06F 8/443; G06F 21/51; G06F 21/52
See application file for complete search history.

(56) References Cited

U.S. PATENT DOCUMENTS

| | | |
|---|---|---|
| 7,970,216 B2 | 6/2011 | Bashyam et al. |
| 8,028,341 B2 | 9/2011 | Cheng et al. |
| 8,082,231 B1 * | 12/2011 | McDaniel ........... G06F 11/1453 707/681 |

(Continued)

OTHER PUBLICATIONS

Sundmark, Daniel et al: "Pinpointing Interrupts in Embedded Real-Time Systems Using Context Checksums", Emerging Technologies and Factory Automation, 2008. ETFA 2008. IEEE International Conference, Sep. 15-18, 2008, pp. 774-781.

(Continued)

*Primary Examiner* — Lewis A Bullock, Jr.
*Assistant Examiner* — Tina Huynh (57) ABSTRACT

An information processing device includes a control unit, a hash unit, and a comparison unit. The control unit runs a program and to store flow control information of the program in a call stack. The hash unit generates a first hash value by applying a hash function to selected data in response to a first context change of the program. The control unit starts or resumes a second process or thread of the program only when the hash unit has generated the first hash value. The hash unit generates a second hash value by re-applying the hash function to the selected data in response to a second context change. The first and second context changes include a termination or interruption of the first process or thread and the second process or thread. The comparison unit determines whether the first hash value and the second hash value are identical.

17 Claims, 5 Drawing Sheets

(56) References Cited

U.S. PATENT DOCUMENTS

| | | | |
|---|---|---|---|
| 2002/0032822 A1* | 3/2002 | Plummer | G06F 8/4442 710/260 |
| 2002/0180778 A1* | 12/2002 | Proudler | H04L 63/0853 715/734 |
| 2003/0074567 A1* | 4/2003 | Charbonneau | G06F 21/565 713/186 |
| 2004/0133777 A1 | 7/2004 | Kiriansky et al. | |
| 2006/0059496 A1* | 3/2006 | Joy | G06F 11/3636 719/310 |
| 2006/0253837 A1 | 11/2006 | Hudson et al. | |
| 2007/0250521 A1 | 10/2007 | Kaminski | |
| 2007/0276793 A1* | 11/2007 | Han | G06F 17/30109 |
| 2007/0288908 A1* | 12/2007 | Cain | G06F 11/3466 717/130 |
| 2008/0310631 A1* | 12/2008 | Lott | H04L 9/0643 380/255 |
| 2008/0313406 A1* | 12/2008 | Kristensen | G06F 11/3471 711/128 |
| 2009/0328005 A1 | 12/2009 | Miskelly | |
| 2010/0287557 A1* | 11/2010 | Dippl | G06F 9/461 718/102 |
| 2011/0302418 A1* | 12/2011 | Fujisaki | H04L 9/0816 713/179 |
| 2013/0212385 A1* | 8/2013 | Schechter | G06F 21/31 713/168 |
| 2013/0226888 A1* | 8/2013 | Govind | G06F 17/30132 707/698 |

OTHER PUBLICATIONS

International Search Report and Written Opinion correlating to PCT/IB2012/051998 dated Dec. 27, 2012.

Supplementary European Search Report dated Jan. 8, 2016 for corresponding EP 12874768.0, 10 pages.

\* cited by examiner

| | |
|---|---|
| 1 | WORD 0 |
| 2 | WORD 1 |
| 3 | WORD 2 |
| 4 | WORD 3 |
| 5 | WORD 4 |
| 6 | WORD 0 |
| 7 | WORD 1 |
| 8 | WORD 3 |
| 9 | CHECKSUM(6, 7, 8) |
| | ISR |
| 10 | COPY(6) |
| 11 | COPY(7) |
| 12 | COPY(8) |
| 13 | CHECKSUM(10, 11, 12) |
| | ITEM(9)=ITEM(13) ? |
| | |

Fig. 3

| | |
|---|---|
| 1 | WORD 0 |
| 2 | WORD 1 |
| 3 | WORD 2 |
| 4 | WORD 3 |
| 5 | WORD 4 |
| 6 | WORD 0 |
| 7 | WORD 1 |
| 8 | WORD 3 |
| 9 | CHECKSUM(6, 7, 8) |
| 10 | MASK |
| 11 | CHECKSUM(9, 10) |
| | ISR |
| 12 | COPY(9) |
| 13 | COPY(10) |
| 14 | CHECKSUM(12, 13) |
| | ITEM(11)=ITEM(14) ? |

INFORMATION PROCESSING DEVICE AND METHOD FOR PROTECTING DATA IN A CALL STACK

FIELD OF THE INVENTION

This invention relates to an information processing device, a method for running a program on an information processing device, and a computer program product.

BACKGROUND OF THE INVENTION

An information processing device is a device capable of running a program. A program may be any sequence of digital data operations. A program may be defined by instructions residing in a programmable or non programmable memory unit of the device. Running a program may involve maintaining a call stack consisting of a variable number of stack items.

A stack may be defined as a sequence of data items that may be increased by appending new items at the end of the sequence and reduced by removing items from the end of the sequence. A stack may be implemented, for example, by means of a last-in first-out (LIFO) buffer. Adding an item to the stack is also referred to as pushing the item to the stack. Removing an item from the stack is also referred to as popping the item from the stack.

It is noted that a program may have a nested structure. For example, a program may comprise calls to various subroutines, and these subroutines may in turn comprise calls to subroutines which in turn may comprise calls to subroutines, and so on. Whenever a subroutine is called, a return address may be pushed to the stack, the return address indicating an instruction which is to be performed after the subroutine has been executed. When the subroutine has been terminated and the return address has been read from the stack, the return address may be popped from the stack.

A call stack is an example of a stack. A call stack may notably comprise information about active processes, threads or subroutines of the program. A call stack may thus be defined as a stack containing process flow information. The content of the call stack can therefore be vital for the proper functioning of the information processing device. For example, any error in a return address may cause the information processing device to process instructions which are completely unrelated to current data values kept in a memory unit of the information processing device. Usually an error in a call stack may cause the information processing device to crash.

SUMMARY OF THE INVENTION

The present invention provides an information processing device, a method and a computer program product.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
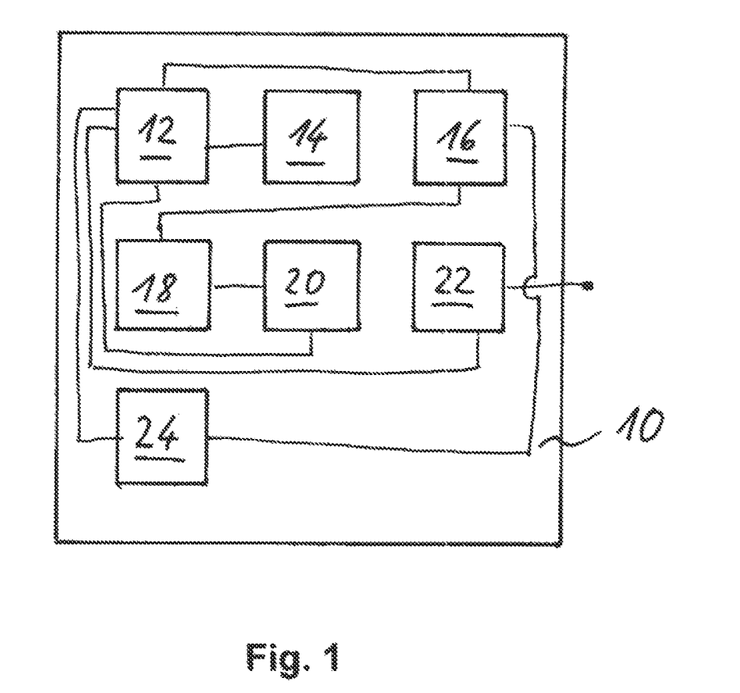
FIG. 1 schematically shows an example of an embodiment of an information processing device.

FIG. 1 schematically shows an example of an information processing device 10. The information processing device 10 may comprise for example a control unit 12, a memory unit 14, a hash unit 16, a comparison unit 18, an error handling unit 20, a back-up unit 22, and a selection unit 24. The units 12, 14, 16, 18, 20, 22, and 24 may be suitably interconnected among each other, as indicated. Each of these units may be implemented by hardware or by software or by a combination of both. For instance, the memory unit 14 may be a physical data storage unit containing executable instructions for the control unit 12. Also, the units 16, 18, 20, 22, and 24 may be implemented by instructions residing in the memory unit 14.

Each of the units 16, 18, 20, 22, and 24 may thus be implemented in form of a software module stored in the memory unit 14. Alternatively, each of these units may for example be provided by a dedicated hardware circuit. The information processing device 10 may notably be a single integrated circuit, such as a general purpose microprocessor, a microcontroller, a digital signal processor or other type of microprocessor, provided on one or more dies in a single integrated circuit package.

Figure 5:
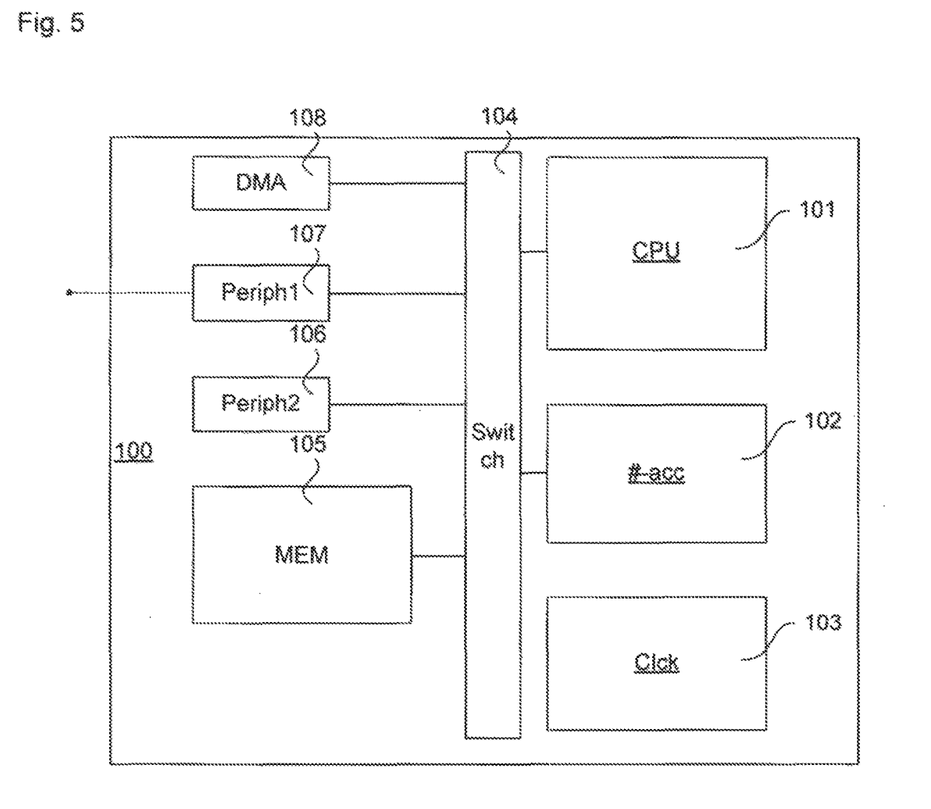
FIG. 5 schematically shows an example of a microprocessor.

Referring to FIG. 5, for example the example of an integrated circuit shown therein is a microprocessor 100. The microprocessor may for example be an application processor, such as a multimedia processor. The shown microprocessor 100 comprises several modules 101-108. As shown, a bus 104 connects the different modules to each other, and allows an exchange of information between the modules. In the example of FIG. 5, the modules comprise a single processing core or central processing unit, CPU, 101. However, the microprocessor may have two or more processing cores. The modules may further comprise one or more hardware accelerators 102 which provides hardware acceleration, for example dedicated hardware unit for evaluating a hash function as indicated in the figure with #-acc. The input data of the hash function may also be referred to as the protected data. As show, the microprocessor further comprises memory 105, in which for example executable instructions for the core 101 are stored which when executed make the core 101 perform the functions of the units of the information processing device 10 described with reference to FIG. 1. The modules may comprise other modules as well such as in the shown example, a clock system 103 which provides and controls the clocks in the microprocessor or a direct memory access module 108. The microprocessor may, as shown have further peripheral modules 106, 107 to e.g. provide connectivity to components external of the microprocessor.

The control unit 12 may run a program and store at least a flow control information of the program in a call stack. The call stack may for instance be maintained in the memory unit 14. The term program is to be understood in a broad sense. For instance, the program may include an operating system, although this is not necessarily the case. The program may alternatively or in addition comprise one or more applications that can be run under the operating system. The program may thus be structured, for example, in one or more operating systems and one or more application, tasks, processes or threads for being run under the active operating system. An application, task, process or thread may be referred to summarily as a process. A switch in the process flow from one active operating system to another active operating system, or from one process to another process is referred to as a context switch. Another example of a context switch is the interruption of the normal process flow within an active program by the execution of an interrupt service routine. An interrupt service routine may be a particular kind of program which may be executed in response to an interrupt signal. Interrupts may be used for instance to perform time critical operations such as responding to input from hardware or to user input.

A context switch may generally involve a risk of corrupting data in the call stack, unless the new process (that is the process initiated with the context switch) is guaranteed not to modify any items that were pushed to the call stack before the new process. Generally, there may be a certain risk that the new process contains an error or malicious instructions which may corrupt the call stack e.g. by deleting or modifying items of the call stack. When the new process has been terminated, there may therefore be a risk that the information processing device 10 continues to operate using the corrupted call stack. In the shown example, the control unit 12, the hash unit 16, and the comparison unit 18 are arranged so as to reduce this risk and thus to make the information processing device 10 more secure.

The hash unit 16 may be arranged to generate a first hash value by applying a hash function to selected data in response to a first context change of the program. The selected data may comprise for example one or more selected items of the call stack. The selected items may comprise the entire call stack at a time of the first context change or only specific items. The entire call stack may thus be protected. The first context change may comprise for instance a termination or interruption of a first process or thread of the program. In this example the control unit 12 may be arranged to start or resume a second process or thread of the program only when the hash unit has generated the first hash value.

The second process or thread may for example be an interrupt service routine. The second process or thread may alternatively be any other kind of process or thread, such as an application triggered by a user or by a task control unit.

A hash function is a mathematical function defined on a set of input data and having a function value (hash value) which is extremely unlikely, or impossible, to be the same for two different or only slightly different input data values. Expressed in mathematical terminology: a hash function is an, injective or close to perfectly injective, function which projects a value from a set with many, or even an infinite number of, members to a value from a set with a fixed number of, e.g. fewer, members.

Check sums are examples of a hash function. Evaluating the same hash function for first input data and for second input data thus provides a fairly reliable means of determining whether the first input data and the second input data are identical or not. Similarly, by applying the same hash function to input data and reapplying it at a later point in time it may be determined whether the input data has changed. The hash function may for example be a cyclic redundancy check (CRC) function, such as CRC32. CRC32 may be chosen as the hash function notably because it may be readily available on accelerators.

As stated above, the control unit 12 may be arranged to start or resume the second process or thread only when the hash unit has generated the first hash value, e.g. after having received a corresponding notification from the hash unit. It may thus be ensured that a hash value for the selected data is generated before there is a risk of the selected data being corrupted after the context change. The hash unit 16 may further be arranged to generate a second hash value by reapplying the hash function to the selected data in response to a second context change. The second context change may comprise a termination or interruption of the second process or thread.

The comparison unit 18 may be arranged to determine whether the first hash value and the second hash value are identical, and for example be connected to the hash unit to receive the generated hash values therefrom. Thus, an indication as to whether the selected data has been corrupted between the first context change and the second context change may be obtained. If the second hash value differs from the first hash value, this is a sure indication that the selected data or the first hash value or both have been modified by the second process or thread. If however the first hash value and the second hash value are identical, the probability that the selected data has been modified after the first context change may be expected to be very low. The comparison unit may e.g. output to the error handling unit a notification indicating the outcome of the determination.

The error handling unit 20 may be arranged to perform at least one of the following actions if the comparison unit has determined that the second hash value differs from the first hash value: (i) issue an error warning (for example in a for humans perceptible form), (ii) stop the control unit, (iii) mark instructions for executing the second process or thread as harmful. These actions may enable the information processing device or a user to take an appropriate action, such as deleting instructions of the second process or thread from the information processing device 10, e.g. from the memory unit 14, or correcting these instructions.

The back-up unit 22 may be arranged to generate a back-up copy of the selected items in response to the first context change, e.g. in response to receiving a contract change notifications, such as from the control unit 12. The control unit may further be arranged to start or resume the second process of thread only when the back-up unit has generated the back-up copy, and for example only start or resume after receiving a back-up finished notification, e.g. from the back-up unit. The back-up unit may further be arranged to restore an original content of the selected items, by copying the back-up copy back to the call stack, when the comparison unit has determined that the second hash value differs from the first hash value.

The hash unit 16 may further be arranged to generate a third hash value by applying the hash function to the back-up copy, and the comparison unit 18 may be arranged to determine also whether the first hash value and the third hash value are identical. When the comparison unit 18 has determined that the second hash value is identical to the first hash value, the data on which the second hash value is based may be declared valid or selected for future use. On the other hand, if the comparison unit 18 determines that the third hash value is identical to the first hash value, the data on which the third hash value is based may be declared valid or selected for future use. The information processing device 10 may thus be made more robust against call stack corruption.

The selection unit 24 may be arranged to generate selection data identifying the selected stack items. The selection data may for instance be given as a bit mask in which each bit indicates a selected item of a call stack, in other words, an item that is to be included in the input data to the hash function. The bit mask may for instance be included in a task control block managed by e.g. the control unit 12. A task control block is a data structure used in a variety of operating systems for managing a particular process. The selected data, i.e. the input data to the hash function may further comprise the selection data, e.g. the bit mask if the selection data is provided in form of a bit mask. In other words, the hash function may be evaluated on the basis of the selected stack items and the selection data. The selection data may thus be included in the protected data.

The hash unit may be further arranged to generate a first supplementary hash value by applying a supplementary hash function to the first hash value and the selection data in response to the first context change and to generate a second supplementary hash value by re-applying the supplementary hash function to the first hash value and the selection data in response to the second context change. The comparison unit may be further arranged to determine whether the first supplementary hash value and the second supplementary hash value are identical. The supplementary hash function may be a CRC function e.g. CRC32.

The hash unit 16 may be arranged, for example, to push copies of the selected items to the call stack such that these copies constitute contiguous items of the call stack. This may enable the control unit 12 to compute hash values for the selected items in an efficient manner.

The information processing device may perform a method for running a program. An example of a method as may be performed is further described in reference to FIG. 2. The method may comprise running a program and storing at least flow control information of the program in a call stack. A first hash value may be generated (block S1) by applying a hash function to selected data in response to a first context change of the program. The selected data may comprise at least one or more selected items of the call stack. The first context change may comprise a termination or interruption of a first process or thread of the program. A second process or thread of the program may be started or resumed only when the first hash value has been generated (block S2). A second hash value may be generated (block S3) by reapplying the hash function to the selected data in response to a second context change. The second context change may comprise, for example, a termination or interruption of the second process or thread. It may then be determined whether the first hash value and the second hash value are identical (block S4). If they are found to be identical, the process flow may return to step S1, and another task or ISR may be run in block S2, or the process before the first context change may be resumed. If however the first and second hash values are found to differ (block S4) an appropriate action may be triggered (block S5), such as generating an error signal, replacing the possibly corrupted stack data by a copy of the original stack data, stopping or restarting the information processing device, or indicating the recent process or thread (i.e. the process or thread responsible for the stack corruption) to e.g. the control unit 12 or to a user.

Figure 2:
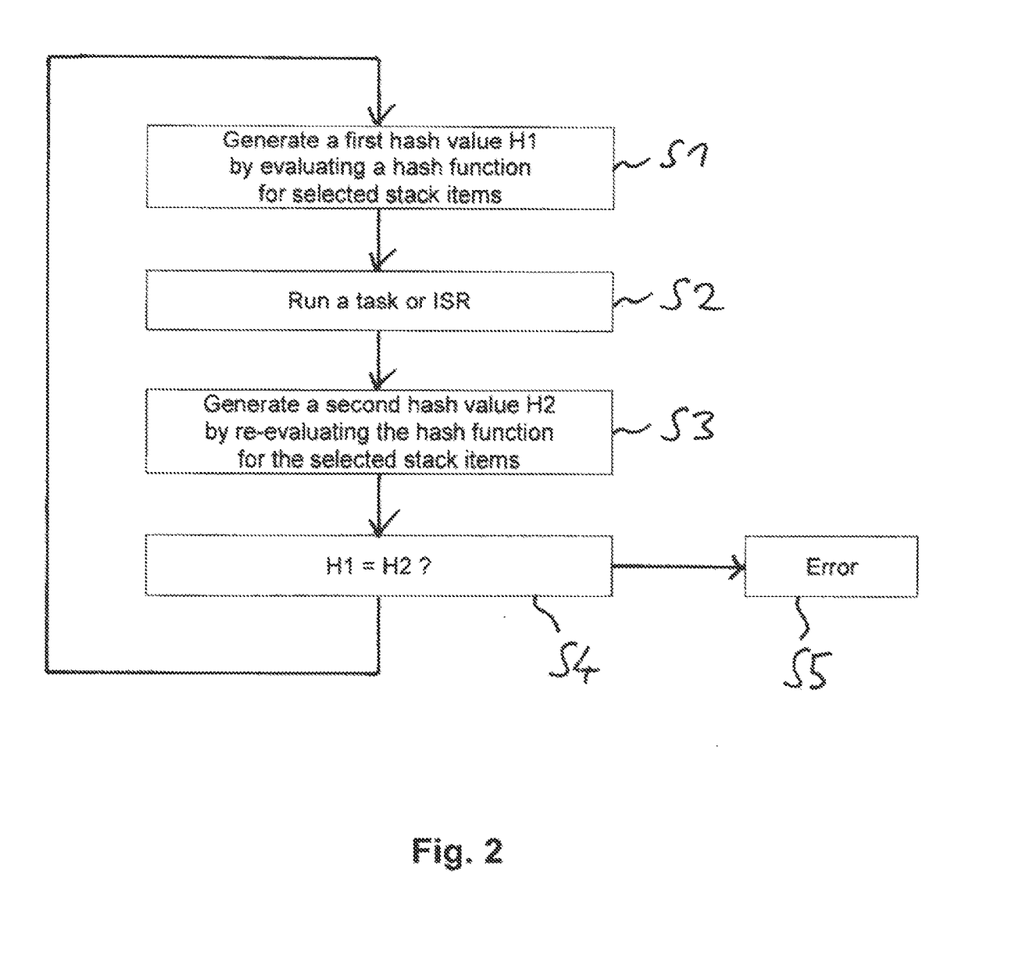
FIG. 2 shows a flow chart of an example of an embodiment of a method for protecting a call stack.

The hash unit 16 may be arranged to compute the first and second hash values by making use of the call stack. This may be particularly efficient as the data to be protected is contained in the call stack. The hash unit 16 may for instance be arranged to push all or only some temporary data used in these computations to the stack.

Figure 3:
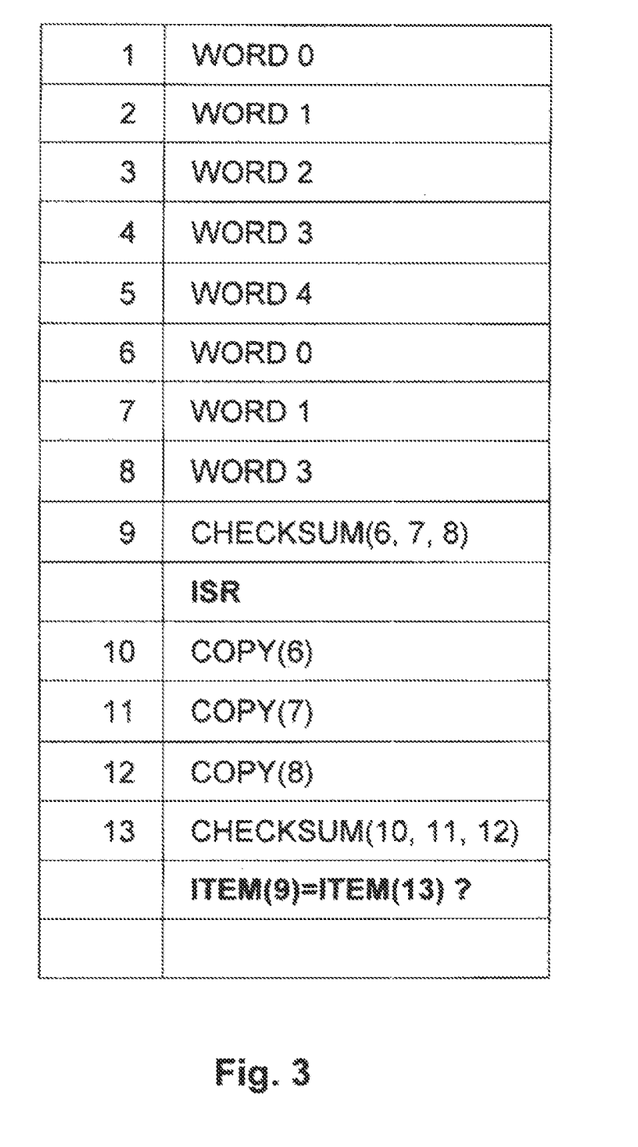
FIG. 3 schematically shows an example of a call stack after execution of an interrupt service routine.

FIG. 3 schematically illustrates the call stack according to the example at a point in time at which the second hash value (item number 13 of the call stack) has been generated. In this example, the call stack is shown to grow in a downward direction. In other words, new items may be added at the bottom of the stack. The call stack as shown may be generated as follows. In an initial state, the call stack comprises, according to this particular example, items numbers 1 to 5 containing words 0 to 4, respectively. The selected items in this example are words numbered 0, 1, and 3. These words may be selected, for example, by means of a bit mask assigning a value of one to words 0, 1, and 3 and a value of 0 to the words 2 and 4. The hash unit 16 may be arranged to push the selected words to the call stack, i.e. copy items 1, 2, and 4 to the end of call stack. The effect is that the selected words are now available in contiguous items 6, 7, and 8 of the call stack. The hash unit 16 may then compute a first hash value from words 0, 1, and 3 in stack items 6, 7, and 8, by applying a hash function to these stack items. The hash function may for instance be a check sum, such as CRC32. The hash unit 16 may push the thus generated first hash value to the call stack, so that the first hash value is now available as item number 9 of the call stack. The control unit 12 may then execute a new process or thread, for instance an interrupt service routine, as indicated by the line between items 9 and 10 of the call stack (this line is not part of the call stack). When this thread or process has been completed or stopped or interrupted, the hash unit 16 may push copies of stack items 6, 7, and 8 to the call stack, so as to provide copies of the selected words 0, 1, and 3. The copies of words number 0, 1, and 3 are thus available as stack items 10, 11, and 12, and the hash unit 16 may compute a second hash value by reapplying the hash function to stack items 10, 11, and 12 containing the copied words number 0, 1, and 3. The hash unit 16 may further push the thus computed second hash value (e.g. the result of a check sum of the items 11, 12, and 13) to the stack. The first hash value and the second hash value are thus available as stack items 9 and 13, respectively, and may be compared so as to obtain an indication as to whether the content of stack items 6, 7, and 8 has changed.

Figure 4:
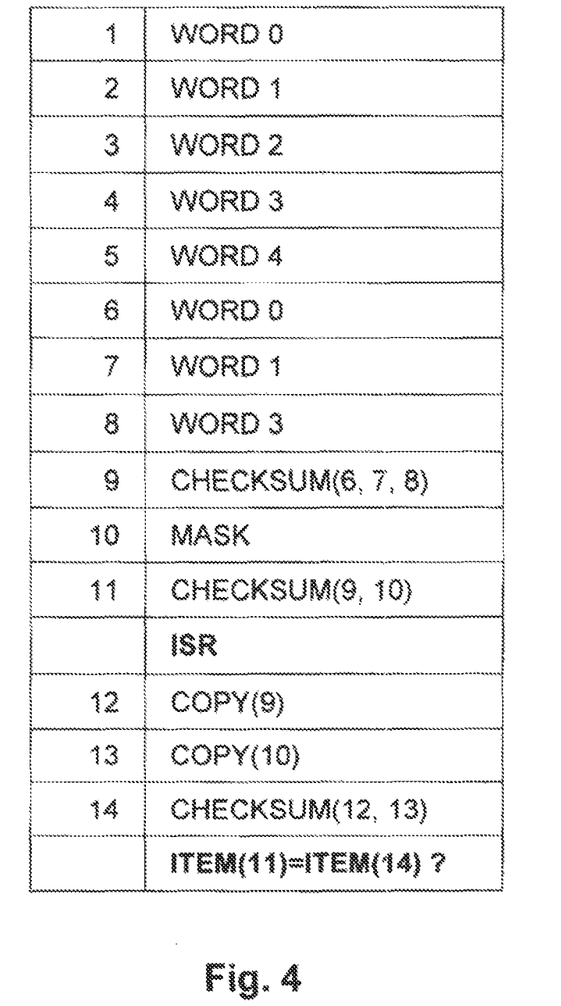
FIG. 4 schematically shows an example of a call stack after execution of an interrupt service routine.

A variant of this method is described in reference to the example of a call stack schematically shown in FIG. 4. As in FIG. 3, the present call stack may comprise, for example, words numbered 0 to 4 stored as items 1 to 5 of the call stack. As in the above examples, each word may for instance represent a return address or some other kind of flow control information. Words 0, 1, and 3 are selected, in this example, to be protected, for instance using a bit mask as described above. The selected words, i.e. the content of items 1, 2, and 4 of the stack, may be pushed to the stack so as to make this data available in contiguous items 6, 7, and 8 of the stack. The hash unit 16 may then generate a first hash value for the selected words, for instance by evaluating a check sum for items 6, 7, and 8. The hash unit 16 may further push the selection data used to specify the words to be protected to the stack where it is then available as item 10. The hash unit 16 may then compute a supplementary hash value for items 9 and 10, that is, for the first hash value (item 9) and the selection data, e.g. the bit mask, (item 10), and push the thus obtained supplementary hash value to the stack, where it is then available as item number 11.

The control unit 12 may then run a second process or thread. The second process or thread may for instance be an interrupt service routine. When the second process or thread has been terminated or interrupted, the hash unit 16 may push copies of items 9 and 10 of the stack to the stack, so that the first hash value and the selection data are then available as contiguous items 12 and 13. The hash unit 16 may then reevaluate the hash function for items 12 and 13 to generate a second hash value. The first supplementary hash value and the second supplementary hash value may then be compared to obtain an indication as to whether the first hash value (in item 9) and the selection data (in item 10) have been modified. If it is found that the first supplementary hash value and the second supplementary hash value differ, an error action may be taken as described above in reference to FIGS. 2 and 3. Otherwise, i.e. when the first and second supplementary hash values are found to be identical, items 12, 13, and 14 may be popped from the stack and copies of items 6, 7, and 8 containing words 0, 1, and 3, respectively may be pushed to the stack (not shown). The hash unit 16 may then reapply the hash function to the copies of words 0, 1, and 3 to generate a second hash value. The comparison unit 18 may then determine whether the first hash value (in item 9) and the newly generated second hash value (not shown) are identical. If they are not identical, an appropriate error action as described above in reference to FIG. 2 or 3 may be taken.

The invention may also be implemented in a computer program for running on a programmable apparatus, such as a computer system, at least including code portions for performing steps of a method according to the invention when run on the programmable apparatus or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following:

magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programrs with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices. In this respect, it should be observed that in the hereinabove the term "computer" has been used to comprise generally any programmable or non-programmable information processing system. An example of a non-programmable computer is a device capable of executing a program, wherein the program is implemented in hardware, such as in a logic circuit or in non-modifiable memory permanently attached to a microprocessor. A programmable information processing system can for example be a mobile phone, an embedded automotive system, a general purpose computer, a network server or other programmable apparatus.

In the foregoing specification, the invention has been described with reference to specific examples of embodiments of the invention. It will, however, be evident that various modifications and changes may be made therein without departing from the scope of the invention as set forth in the appended claims, which accordingly are not limited to the specific example shown or described above For instance, in the example of FIG. 5 instructions are stored in the on-chip memory 105, however these may alternatively or additionally be stored in off-chip memory connected to the microprocessor e.g. through a peripheral 107.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the hash unit and the comparison unit may be integrated in the control unit 12 or into a memory management unit (MMM) (not shown) connected to the memory unit 14.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An information processing device, comprising:
a control circuit arranged to run a program and to store at least flow control information of said program in a call stack;
a hash circuit arranged to generate a first hash value by applying a hash function to selected data in response to a first context change of said program, said selected data comprising one or more selected items of said call stack, said first context change comprising a termination or interruption of a first process or thread of said program;
said control circuit is further arranged to start or resume a second process or thread of said program only when said hash circuit has generated said first hash value;
said hash circuit is further arranged to generate a second hash value by re-applying said hash function to selected data in response to a second context change, said second context change comprising a termination or interruption of said second process or thread; and
said information processing device further comprising:
a comparison circuit is arranged to determine whether said first hash value and said second hash value are identical; and
a backup circuit to restore an original content of said selected items, by copying a back-up copy back to said call stack, when said comparison circuit has determined that said second hash value differs from said first hash value.

2. The information processing device of claim 1, further comprising an error handling circuit arranged to perform at least one of the following actions when said comparison circuit has determined that said second hash value differs from said first hash value:
issue an error warning; and
stop said control circuit.

3. The information processing device of claim 1, further comprising the back-up circuit arranged to generate the back-up copy of said selected items in response to said first context change, wherein said control circuit is arranged to start or resume said second process or thread only when said back-up circuit has generated said back-up copy.

4. The information processing device of claim 1, wherein said second process or thread is an interrupt service routine.

5. The information processing device of claim 1, wherein said hash function is a cyclic redundancy check (CRC) function.

6. The information processing device of claim 1, comprising a selection circuit arranged to generate selection data identifying said selected stack items.

7. The information processing device of claim 6, wherein said selected data further comprises said selection data identifying said selected stack items.

8. The information processing device of claim 6, wherein said hash circuit is further arranged to generate a first supplementary hash value by applying a supplementary hash function to said first hash value and said selection data in response to said first context change and to generate a second supplementary hash value by re-applying said supplementary hash function to said first hash value and said selection data in response to said second context change, and
said comparison circuit is further arranged to determine whether said first supplementary hash value and said second supplementary hash value are identical.

9. The information processing device of claim 1, wherein said hash circuit is arranged to push copies of said selected items to said call stack such that said copies of said selected items are contiguous items of said call stack.

10. The information processing device of claim 1, wherein said selected items comprise the entire stack at a time of said first context change.

11. The information processing device of claim 1, wherein said program includes an operating system.

12. The information processing device of claim 1, wherein said information processing device is an integrated circuit.

13. A method for executing a program on an information processing device, comprising:
- running said program on the information processing device;
- storing at least flow control information of said program in a call stack;
- generating a first hash value by applying a hash function to selected data in response to a first context change of said program, said selected data comprising one or more selected items of said call stack, said first context change comprising a termination or interruption of a first process or thread of said program;
- starting or resuming a second process or thread of said program only when said first hash value has been generated;
- generating a second hash value by re-applying said hash function to said selected data in response to a second context change, said second context change comprising a termination or interruption of said second process or thread;
- determining whether said first hash value and said second hash value are identical; and
- restoring, by a back-up circuit, an original content of said selected items, by copying a back-up copy back to said call stack, when the second hash value differs from the first hash value.

14. The method of claim 13, further comprising:
- performing, by an error handling circuit, at least one of the following actions when the second hash value differs from the first hash value:
  - issuing an error warning; and
  - stopping the program.

15. The method of claim 13, further comprising:
- generating, by the back-up circuit, the back-up copy of said selected items in response to said first context change; and
- starting or resuming said second process or thread only when said back-up circuit has generated said back-up copy.

16. A computer program product on tangible computer-readable medium for running on a programmable apparatus, at least including code portions for performing steps of a method when run on a programmable apparatus, the method comprising;
- running said program on the information processing device;
- storing at least flow control information of said program in a call stack;
- generating a first hash value by applying a hash function to selected data in response to a first context change of said program, said selected data comprising one or more selected items of said call stack, said first context change comprising a termination or interruption of a first process or thread of said program;
- starting or resuming a second process or thread of said program only when said first hash value has been generated;
- generating a second hash value by re-applying said hash function to said selected data in response to a second context change, said second context change comprising a termination or interruption of said second process or thread;
- determining whether said first hash value and said second hash value are identical; and
- restoring, by a back-up circuit, an original content of said selected items, by copying a back-up copy back to said call stack, when the second hash value differs from the first hash value.

17. The computer program product on tangible computer-readable medium of claim 16, further comprising:
- generating, by the back-up circuit, the back-up copy of said selected items in response to said first context change; and
- starting or resuming said second process or thread only when said back-up circuit has generated said back-up copy.

* * * * *